United States Patent
Fang et al.

(10) Patent No.: US 11,103,790 B2
(45) Date of Patent: Aug. 31, 2021

(54) GAME PICTURE DISPLAY METHOD AND APPARATUS AND COMPUTER-READABLE STORAGE MEDIUM

(71) Applicant: Tencent Technology (Shenzhen) Company Limited, Shenzhen (CN)

(72) Inventors: Juexiao Fang, Shenzhen (CN); Hui Shan, Shenzhen (CN)

(73) Assignee: TENCENT TECHNOLOGY (SHENZHEN) COMPANY LIMITED, Guangdong Province (CN)

(*) Notice: Subject to any disclaimer, the term of this patent is extended or adjusted under 35 U.S.C. 154(b) by 14 days.

(21) Appl. No.: 16/749,869

(22) Filed: Jan. 22, 2020

(65) Prior Publication Data

US 2020/0238181 A1 Jul. 30, 2020

Related U.S. Application Data

(63) Continuation of application No. PCT/CN2018/096788, filed on Jul. 24, 2018.

(30) Foreign Application Priority Data

Jul. 24, 2017 (CN) .......................... 201710611203.8

(51) Int. Cl.
*A63F 13/77* (2014.01)
*A63F 13/25* (2014.01)
(Continued)

(52) U.S. Cl.
CPC .............. *A63F 13/77* (2014.09); *A63F 13/25* (2014.09); *H04L 67/38* (2013.01);
(Continued)

(58) Field of Classification Search
CPC ...... A63F 13/25; A63F 13/77; A63F 2300/30; A63F 2300/552; H04L 67/38; H04M 1/72427
See application file for complete search history.

(56) References Cited

U.S. PATENT DOCUMENTS

2005/0128220 A1* 6/2005 Marrin .................... G06T 13/00
345/619
2008/0055318 A1* 3/2008 Glen ........................ G09G 3/20
345/501
(Continued)

FOREIGN PATENT DOCUMENTS

CN 102737619 A 10/2012
CN 104090745 A 10/2014
(Continued)

OTHER PUBLICATIONS

Tencent Technology, ISRWO, PCT/CN2018/096788, Sep. 30, 2018, 6 pgs.
(Continued)

*Primary Examiner* — Steve Rowland
(74) *Attorney, Agent, or Firm* — Morgan, Lewis & Bockius LLP

(57) ABSTRACT

The present application discloses a game picture display method and apparatus and a computer-readable storage medium. The method includes: displaying a picture in a target game in a client of the target game in a first display mode in response to that the client runs the target game, the client being installed on a mobile device; acquiring first state information of the mobile device; and switching a display mode of the client from the first display mode to a second display mode in a case that the first state information does not match the first display mode, and continuing to display the picture in the target game in the client in the second display mode, the target game in the client being kept in a
(Continued)

running state in a process of switching the display mode. The present application solves the technical problem that a game cannot run smoothly in the related art.

20 Claims, 6 Drawing Sheets

(51) Int. Cl.
*H04L 29/06* (2006.01)
*H04M 1/72427* (2021.01)

(52) U.S. Cl.
CPC ..... *H04M 1/72427* (2021.01); *A63F 2300/30* (2013.01); *A63F 2300/552* (2013.01)

(56) References Cited

U.S. PATENT DOCUMENTS

| | | | | |
|---|---|---|---|---|
| 2011/0164860 | A1* | 7/2011 | Nakagawa | H04N 5/783 386/343 |
| 2013/0106810 | A1* | 5/2013 | Kim | G06F 1/3206 345/204 |
| 2013/0203501 | A1* | 8/2013 | Pereira | A63F 13/86 463/42 |
| 2013/0257752 | A1* | 10/2013 | Tripathi | G06T 19/006 345/173 |
| 2014/0289423 | A1* | 9/2014 | Kim | H04N 21/44227 709/233 |
| 2015/0348493 | A1* | 12/2015 | Chae | G09G 5/00 345/212 |
| 2017/0212771 | A1* | 7/2017 | Weissberg | G06F 3/04845 |
| 2019/0262711 | A1* | 8/2019 | Perlman | H04N 9/79 |

FOREIGN PATENT DOCUMENTS

| | | |
|---|---|---|
| CN | 104461520 A | 3/2015 |
| CN | 104461718 A | 3/2015 |
| CN | 104991775 A | 10/2015 |
| CN | 105025382 A | 11/2015 |
| CN | 106033292 A | 10/2016 |
| CN | 106055358 A | 10/2016 |
| CN | 106502670 A | 3/2017 |
| CN | 106648865 A | 5/2017 |
| CN | 106816134 A | 6/2017 |
| CN | 106919401 A | 7/2017 |
| CN | 107398072 A | 11/2017 |
| JP | 2017064408 A | 4/2017 |

OTHER PUBLICATIONS

Tencent Technology, IPRP, PCT/CN2018/096788, Jan. 28, 2020, 5 pgs.

* cited by examiner

GAME PICTURE DISPLAY METHOD AND APPARATUS AND COMPUTER-READABLE STORAGE MEDIUM

CROSS-REFERENCE TO RELATED APPLICATIONS

This application is a continuation application of PCT/CN2018/096788, entitled "GAME PICTURE DISPLAY METHOD AND APPARATUS AND COMPUTER-READABLE STORAGE MEDIUM" filed on Jul. 24, 2018, which claims priority to Chinese Patent Application No. 201710611203.8, entitled "GAME PICTURE DISPLAY METHOD AND APPARATUS" filed with the Chinese Patent Office on Jul. 24, 2017, both of which are incorporated by reference in their entirety.

FIELD OF THE TECHNOLOGY

The present application relates to the field of Internet, and in particular, to a game picture display method and apparatus and a computer-readable storage medium.

BACKGROUND OF THE DISCLOSURE

With the continuous development and popularization of Internet technologies, users have increasing demands for online entertainment. Taking gaming as an example, at present, commercially available online game clients provide a function of setting performance effects of games on clients.

As shown in FIG. 1, when a user sets various game effects (for example, definition, image quality, and a frame rate) in a game setting window before playing a game on a computer, the user needs to understand the meanings of technical indicators of hardware performance of the computer and the impact of performance effects on the hardware performance. A user without related knowledge may endure severely affected experience due to inappropriate game settings. At present, many games are run on mobile phones, and users know even less about hardware technology of mobile phones than computers.

Because users have limited knowledge of hardware technology of mobile devices, it is very likely that actually available hardware resources on a mobile device are inadequate for running a game with particular settings. As a result, there are frequent freezes, frame drops, and disconnections during gaming.

At present, no effective solution has been proposed to solve the technical problem that a game cannot run smoothly in the related art.

SUMMARY

Embodiments of the present application provide a game picture display method and apparatus and a computer-readable storage medium, to solve the technical problem that a game cannot run smoothly in the related art.

According to an aspect of the embodiments of the present application, a game picture display method is applied to a mobile device having one or more processors and memory storing a plurality of programs to be executed by the one or more processors. The display method includes: displaying a picture in a target game in a client of the target game in a first display mode in response to that the client runs the target game, the client being installed on a mobile device; acquiring first state information of the mobile device, the first state information being configured for indicating a state of the mobile device during display in the client in the first display mode; and switching a display mode of the client from the first display mode to a second display mode in a case that the first state information does not match the first display mode, and continuing to display the picture in the target game in the client in the second display mode, the second display mode being a display mode determined according to the first state information, and the target game in the client being kept in a running state in a process of switching the display mode.

According to another aspect of the embodiments of the present application, a mobile device comprises one or more processors, memory coupled to the one or more processors and a plurality of programs stored in the memory that, when executed by the one or more processors, cause the computing device to perform the game picture display method.

An embodiment of the present application further provides a non-transitory computer readable storage medium storing a plurality of machine readable instructions in connection with a mobile device having one or more processors, wherein the plurality of machine readable instructions, when executed by the one or more processors, cause the mobile device to perform the foregoing game picture display method.

In the embodiments of the present application, a picture in a target game in a client of the target game is displayed in a first display mode in response to that the client runs the target game; first state information of a mobile device during display in the client in the first display mode is acquired; a display mode of the client is switched from the first display mode to a second display mode in a case that the first state information does not match the first display mode, and the picture in the target game continues to be displayed in the client in the second display mode, the target game in the client being kept in a running state in a process of switching the display mode. The second display mode is a display mode determined according to the first state information and matches a current running state of the mobile device, so that it can be ensured that the game runs smoothly. In this way, the technical problem that a game cannot run smoothly in the related art is resolved, thereby further achieving a technical effect of adjusting a display mode to enable a game to run more smoothly without interrupting the game.

BRIEF DESCRIPTION OF THE DRAWINGS

The accompanying drawings described herein are used to provide a further understanding of the present application, and form a part of the present application. Exemplary embodiments of the present application and descriptions thereof are used to describe the present application, and do not constitute any inappropriate limitation to the present application. In the accompanying drawings.

DESCRIPTION OF EMBODIMENTS

To make a person skilled in the art better understand the solutions of the present application, the following clearly and completely describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

In the specification, claims, and accompanying drawings of the present application, the terms "first", "second", and so on are intended to distinguish between similar objects but do not necessarily indicate a specific order or sequence. It is to be understood that the data termed in such a way are interchangeable in proper circumstances so that the embodiments of the present application described herein can be implemented in orders other than the order illustrated or described herein. Moreover, the terms "include", "have" and any variants thereof intend to cover the non-exclusive inclusion, for example, a process, method, system, product or device that includes a list of steps or units is not necessarily limited to those units, but may include other units not expressly listed or inherent to such a process, method, system, product or device.

First, some nouns or terms appearing in a process of describing the embodiments of the present application apply to the following explanations:

Runtime: Instead of directly entering core content of a game, a game program starts with an interface such as a function menu of the game after being started, and later enters a core game part of the game. A game having rounds returns to a menu state after a round ends. The runtime herein is a period of time during which the core game part of the game program runs.

Dynamic change: Dynamic change is a state in which a hardware performance condition and software execution efficiency of a mobile phone change during the running of a game program due to consumption of the program and the impact of external programs and the system.

Static optimization: Current device performance is detected as soon as a game is launched to acquire hardware performance information such as central processing unit (CPU) frequency, total internal memory, available internal memory, and an OpenGL ES version that affects the running of the game, and an optimization measure is adopted according to such information.

OpenGL for Embedded Systems (OpenGL ES) is a subset of the OpenGL 3D graphics API designed for embedded devices such as mobile phones, personal digital assistants (PDAs), and video game consoles.

According to an embodiment of the present application, a game picture display method is provided.

Figure 1:
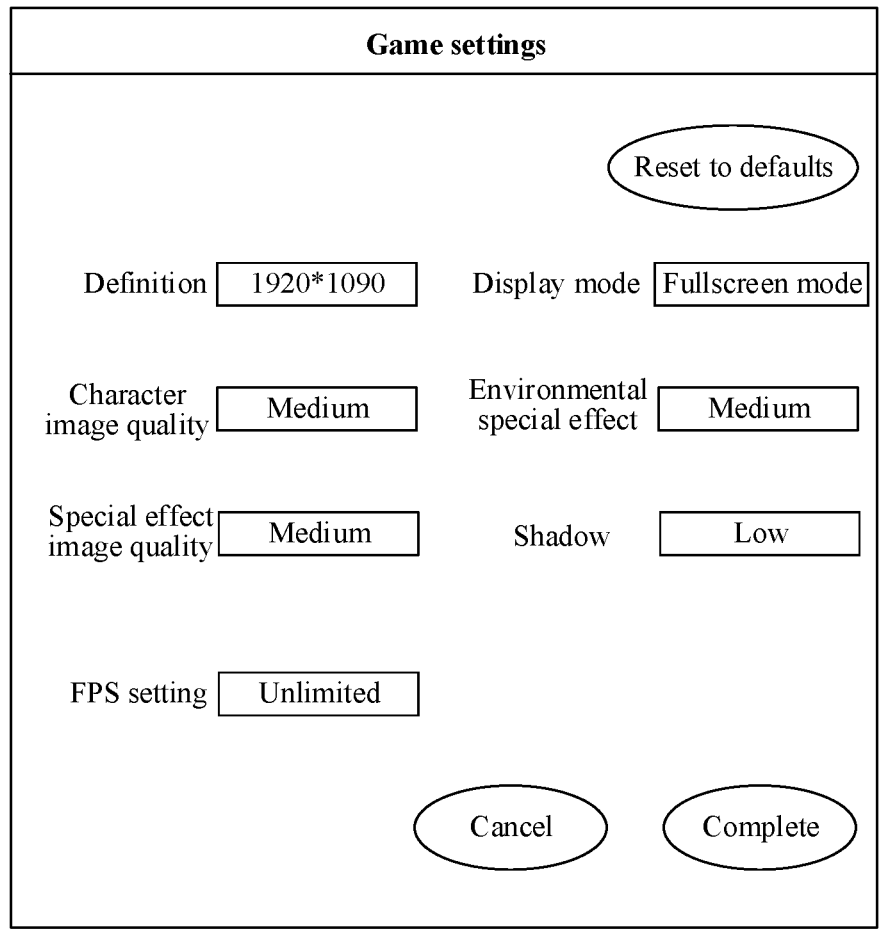
FIG. 1 is a schematic diagram of a game setting interface in the related art.
Figure 2:
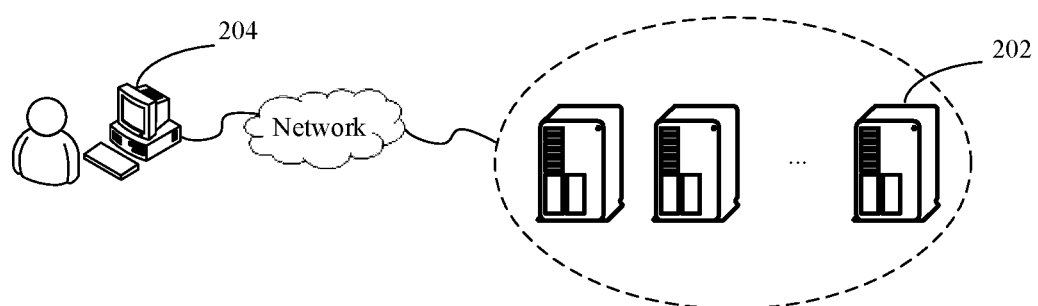
FIG. 2 is a schematic diagram of a hardware environment of a game picture display method according to an embodiment of the present application.

Optionally, in this embodiment, the foregoing game picture display method may be applied to a hardware environment formed by a server 202 and a terminal 204 shown in FIG. 2. As shown in FIG. 2, the server 202 is connected to the terminal 204 by a network. The network includes, but is not limited to, a wide area network (WAN), a metropolitan area network (MAN) or a local area network (LAN). The terminal 204 includes, but is not limited to, a personal computer (PC), a mobile phone, and a tablet computer. The game picture display method in this embodiment of the present application may be performed by the server 202, or may be performed by the terminal 204, or may be performed by both the server 202 and the terminal 204. When the terminal 204 performs the game picture display method in this embodiment of the present application, the method may be alternatively performed by a client installed on the terminal 204.

Figure 3:
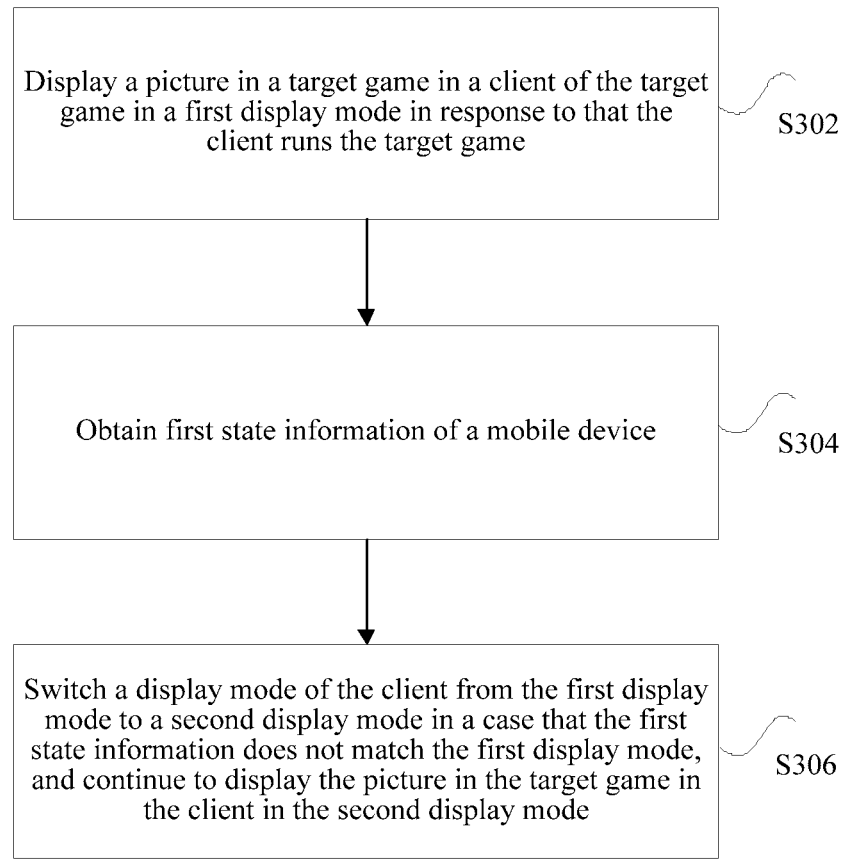
FIG. 3 is a flowchart of an optional game picture display method according to an embodiment of the present application.

FIG. 3 is a flowchart of an optional game picture display method according to an embodiment of the present application. The display method is applied to a mobile device installed with a client. As shown in FIG. 3, the method includes the following steps:

Step S302: A mobile device displays a picture in a target game in a client in a first display mode in response to that the target game is run.

A display mode is a strategy such as a display frame rate or a picture render mode used for configuring a picture displayed in the client. Different display frame rates and picture render modes consume and require different hardware resources of the mobile device. To enable the mobile device to run a game smoothly in a corresponding display mode, the mobile device needs to maintain a particular amount of remaining resources in addition to hardware resources that need to be consumed currently.

Step S304: Acquire first state information of the mobile device.

In this embodiment of the present application, the first state information is a state of the mobile device acquired by the mobile device during display in the client in the first display mode. For example, the first state information may include one or more pieces of information such as a display frame rate, an amount of consumed hardware resources, and an amount of remaining hardware resources during the running of the game by the mobile device.

Step S306: Switch a display mode of the client from the first display mode to a second display mode in a case that the first state information does not match the first display mode, and continue to display the picture in the target game in the client in the second display mode. The second display mode is a display mode determined according to the first state information. The target game in the client is kept in a running state in a process of switching the display mode.

To ensure that the mobile device runs the game smoothly in the first display mode, the mobile device needs to maintain remaining hardware resources and a display frame rate that are required for the first display mode. In this case, resource information and a display frame rate in the acquired first state information can be respectively compared with the required remaining resources and display frame rate corresponding to the first display mode. If the actual remaining resources are not fewer than the remaining resources required for the first display mode and the actual display frame rate is not less than the required display frame, it is determined that the first state information matches the first display mode. Otherwise, it is determined that the first state information does not match the first display mode, and the display mode needs to be switched.

Similarly, to ensure that the mobile device runs the game smoothly in the second display mode, the mobile device needs to maintain remaining hardware resources and a display frame rate required for the second display mode. In this case, the second display mode after switching is considered as a new first display mode to repeat the foregoing step S302 to step S306 to determine whether the display mode matches first state information another time and then determine whether to switch the display mode again.

By means of the foregoing step S302 to step S306, a picture in a target game in a client of the target game is displayed in a first display mode in response to that the client runs the target game; first state information of a mobile device during display in the client in the first display mode is acquired; a display mode of the client is switched from the first display mode to a second display mode in a case that the first state information does not match the first display mode, and the picture in the target game continues to be displayed in the client in the second display mode, the target game in the client being kept in a running state in a process of switching the display mode. The second display mode is a display mode determined according to the first state information and matches a current running state of the mobile device, so that it can be ensured that the game runs smoothly. In this way, the technical problem that a game cannot run smoothly in the related art is resolved, thereby further achieving a technical effect of adjusting a display mode to enable a game to run more smoothly without interrupting the game.

A game is set before being started in the related art. This practice is not suitable for a mobile phone environment with greatly varying performance conditions. Mobile phones have varied hardware conditions and varied systems, and many complex factors may affect performance during running. In such a fickle software running environment (for example, the start of background applications, and internal memory re-allocation), it is rather rigid or even unpractical for a user to choose performance configurations that are expected to enable the game to run smoothly.

Because mobile phones have greatly varying environmental performance conditions, game setting before a game is started is not suitable for high-paced games. For high-paced games such as battle games, parkour games, and racing games, users expect a smooth, efficient, and fast game pace. However, conventional optimization manners tend to ruin such a game pace. A player is forced to repeatedly pause a game to adjust performance during gaming, resulting in terrible user experience.

In the present application, real-time performance monitoring during running of a game application and an optimization technology with a multilevel optimization strategy set are used in combination with a conventional static optimization scheme at startup of a program, so that mobile game products can be automatically run with the best effect and efficiency under fickle hardware performance conditions, thereby improving product quality and user experience. This embodiment of the present application is described below in detail with reference to step S302 to step S306:

In the technical solution provided in step S302, current state information of a mobile device is acquired before the client runs the target game, and the first display mode configured for displaying the picture in the target game in the client during running of the target game is determined according to the current state information of the mobile device. That is, the picture in the target game is displayed in the client in the first display mode in response to that the client runs the target game. How the mobile device determines the first display mode may specifically include the following two substeps:

Step S3022: Establish an optimization strategy set.

First, optimization strategies (including the display mode) used in the game program are categorized. The optimization strategies used in the game program include three categories: startup optimization strategies, runtime real-time optimization strategies, and runtime non-real-time optimization strategies. Next, the optimization strategies in each category are separately sorted to list strategy levels. As shown in Table 1:

TABLE 1

| Strategy level | Startup optimization strategy | Runtime real-time optimization strategy | Runtime non-real-time optimization strategy |
| --- | --- | --- | --- |
| 1 | Startup optimization strategy 1 | Real-time optimization strategy 1 | Non-real-time optimization strategy 1 |
| 2 | Startup optimization strategy 2 | Real-time optimization strategy 2 | Non-real-time optimization strategy 2 |
| ... | ... | ... | ... |
| N | Startup optimization strategy n | Real-time optimization strategy n | Non-real-time optimization strategy n |

A strategy level is correlated to a performance degree of a device. The principle is that a larger strategy level needs to be executed for a device with weaker performance. A strategy set is a set that can be supplemented and extended and can vary correspondingly with the development of technical knowledge.

In this embodiment of the present application, the startup optimization strategy, the runtime real-time optimization strategy, and the runtime non-real-time optimization strategy shown in the foregoing Table 1 can be separately determined and selected. For example, before running the target game, the mobile device may first determine a strategy level of a startup optimization strategy according to the hardware and operating system of the mobile device to select an appropriate startup optimization strategy. During running of the target game, the mobile device may determine strategy levels of a runtime real-time optimization strategy and a runtime non-real-time optimization strategy in real time according to a running state of the mobile device, so as to select an appropriate real-time optimization strategy and non-real-time optimization strategy.

The startup optimization strategy may include adjusting internal memory (for example, closing some background programs to release internal memory). To be specific, the startup optimization strategy may be used for adjusting internal memory in response to that the target game is started (to ensure that there are sufficient internal memory resources and CPU resources). For example, in this embodiment of the present application, internal memory adjustments can be pre-graded, including, for example, cleaning up no internal memory, cleaning up internal memory occupied by some programs, and cleaning up internal memory occupied by all other programs. In this way, internal memory on the mobile device can be adjusted in advance according to a hardware state of the mobile device in response to that the game is started.

The runtime real-time optimization strategy is a strategy that can make real-time adjustments during running of the game. For example, display effects are adjusted during running of the game. For example, in this embodiment of the present application, display effects of a game picture and performance impact degrees can be pre-graded, including: display effects with full special effects, display effects without particles and outlines, display effects without background layers, or the like. In this way, display effects can be adjusted in real time according to state information of the mobile device.

The runtime non-real-time optimization strategy is a strategy of prompting a user to adjust the running of a game according to a prompted strategy during running, for example, a frame reduction strategy of reducing a display frame rate of a game picture.

The determining, according to the current state information of the mobile device, the first display mode configured for displaying the picture in the target game in the client during running of the target game in the present application is selecting a corresponding runtime real-time optimization strategy.

Figure 4:
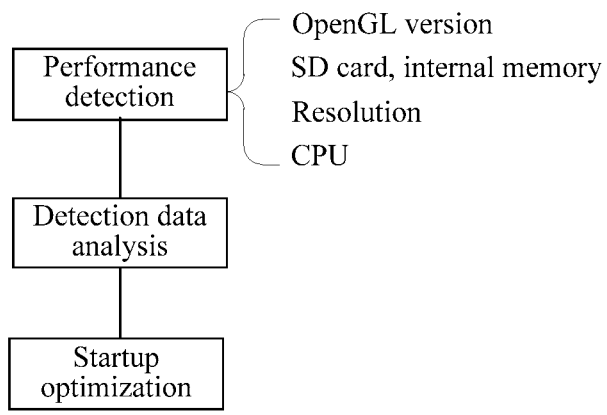
FIG. 4 is a schematic diagram of optional static optimization of a game picture according to an embodiment of the present application.

Step S3024: Perform a static optimization procedure at startup. As shown in FIG. 4:

This optimization procedure is used for detecting and collecting performance information of the mobile phone in response to that the program is started, so as to set a program optimization strategy in an initial state to provide solid foundation and adequate preparation for subsequent dynamic optimization. Current device performance is detected as soon as a game is started, and hardware performance information such as CPU frequency, total internal memory (including SD card internal memory and mobile phone internal memory), available internal memory, an OpenGL ES version, and resolution that affects the running of the game are acquired.

Figure 5:
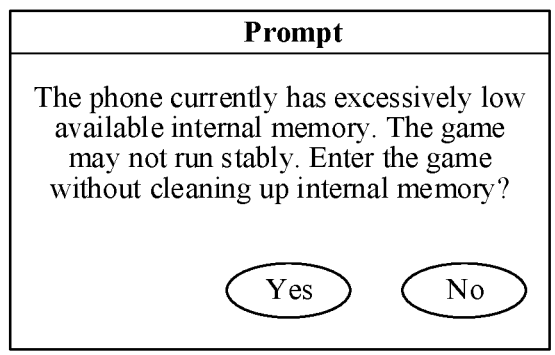
FIG. 5 is a schematic diagram of an optional optimization prompt according to an embodiment of the present application.

Machine performance is graded by using the acquired information. A level of such hardware performance information is determined for performance requirements of this game program, and it is determined whether the game program can be run or not. Next, possible risks (for example, the current available internal memory is too small or an OpenGL ES version is not supported) are informed to a user based on the graded hardware performance information, showing a confirmation dialog box shown in FIG. 5 to remind the user that "The phone currently has excessively low available internal memory. The game may not run stably. Enter the game without cleaning up internal memory?" to improve user experience. In addition, a corresponding startup optimization strategy is set according to machine performance grading information, and an initial state of the runtime optimization strategy of the game is further preset. For example, in this embodiment of the present application, if it may be determined by using the acquired hardware performance information of the mobile device that internal memory is sufficient to support the running of the game, a startup optimization strategy of cleaning up no internal memory may be correspondingly used. If it may be determined by using the acquired hardware performance information of the mobile device that a small amount of internal memory needs to be released to support the running of the game, a startup optimization strategy of cleaning up internal memory occupied by some programs may be correspondingly used. If it may be determined by using the acquired hardware performance information of the mobile device that internal memory is excessively low and a large amount of internal memory needs to be cleaned up to support the running of the game, a startup optimization strategy of cleaning up internal memory occupied by all other programs may be correspondingly used.

In a case of determining, according to the current state information of the mobile device, the first display mode configured for displaying the picture in the target game in the client during running of the target game, an appropriate runtime real-time strategy (for example, the first display mode) may be selected for the picture according to current remaining CPU resources and remaining internal memory. Different runtime real-time strategies consume different amounts of CPU resources and internal memory resources (which may be respectively within a particular range of CPU resources and a particular range of internal memory resources). Therefore, a runtime real-time strategy may be determined by determining a range to which remaining CPU resources belong and a range to which internal memory resources belong, and includes a runtime real-time optimization strategy and a runtime non-real-time optimization strategy.

By means of detection and static optimization in a startup stage of the program, optimization levels of the current program such as "startup optimization strategy 2", "runtime real-time optimization strategy 2" in an initial state, and "non-real-time optimization strategy 1" during runtime can be acquired.

Such processing can be used for optimizing a configuration that satisfies a machine performance initial state. In the configuration, a runtime initial state configuration can be set according to the developer's experience, and is therefore static and relatively fixed. Subsequent runtime dynamic optimization is used for automatically determining an appropriate optimization combination by using a machine state.

In the technical solution provided in step S304, the hardware resource includes a computing resource (for example, a CPU, a graphical processing unit (GPU) or an accelerator) and a storage resource (for example, internal memory, a flash memory, a Secure Digital (SD) card or a machine internal storage). In response to that the first state information of the mobile device is acquired, a resource parameter of the computing resource of the mobile device is acquired, and a resource parameter of the storage resource of the mobile device is acquired. A picture display frame rate used by the mobile device to display the picture in the target game in the client is acquired.

In the technical solution provided in step S306, the display mode of the client is configured for indicating a picture display frame rate and a picture render mode. Before the display mode of the client is switched from the first display mode to the second display mode, it is determined in the following manners whether the first state information matches the first display mode: determining whether a picture display frame rate (an actual display frame rate) indicated by the first state information is not less than a picture display frame rate (a minimum display frame rate required for the display mode) indicated by the first display mode, and determining whether a resource parameter indicated by the first state information is within a parameter range corresponding to a picture render mode indicated by the first display mode. The resource parameter is a parameter of a hardware resource of the mobile device. The step mainly includes the following substeps:

The parameter of the hardware resources of the mobile device includes a resource parameter of a computing resource and a resource parameter of a storage resource. The resource parameter of the computing resource includes a total quantity of resources, resources occupied by a current display mode, a quantity of used resources, and a quantity of remaining resources. The resource parameter of the storage resource includes a total quantity of resources, resources occupied by a current display mode, a quantity of used resources, and a quantity of remaining resources.

Step S3062: Determine whether remaining resources meet requirements of a current display mode. Different picture render modes have different degrees of rendering and consume different quantities of hardware resources. To determine whether a resource parameter indicated by the first state information is within a parameter range corresponding to a picture render mode indicated by the first display mode, it may be determined whether a current quantity of remaining resources is within a resource quantity range (that is, the parameter range) allowed by the first display mode.

It is determined that the first state information matches the first display mode in response to that it is determined that the picture display frame rate indicated by the first state information is not less than the picture display frame rate indicated by the first display mode and the resource parameter indicated by the first state information is within the parameter range corresponding to the picture render mode indicated by the first display mode.

Step S3064: Determine the second display mode to be used after switching.

A plurality of display modes pre-configured in the client are acquired before the display mode of the client is switched from the first display mode to the second display mode. The second display mode is selected from the plurality of display modes according to the first state information.

Resources allowed to be used by the second display mode are determined according to resources occupied by a current display mode and a quantity of remaining resources. It is determined whether resources that remain after each of the determined plurality of display modes uses resources during execution still meet the requirements of the display mode. If the remaining resources still meet the requirements, the display mode is determined as the second display mode. Internal memory is used as an example for description below. As shown in Table 2, different display modes occupy different amounts of internal memory and require different amounts of remaining internal memory.

TABLE 2

| Display mode number | Occupied internal memory | Required remaining internal memory |
|---|---|---|
| 1 | 800M | 800M |
| 2 | 600M | 400M |
| 3 | 500M | 350M |
| ... | ... | ... |
| k | 300M | 250M |

It is assumed that in the display mode 1, actual remaining internal memory is 100 M and is obviously insufficient for smooth running of the game. In this case, the display mode needs to be adjusted. If the display mode is adjusted to the display mode 2, remaining internal memory is (800+100−600) M and obviously still cannot meet a remaining internal memory requirement of 400 M. In this case, the display mode 3 continues to be determined. The remaining internal memory of the display mode 3 is (800+100−500) M, and the remaining 400 M can meet the requirement of minimum remaining 350 M. That is, the display mode 3 is the second display mode.

Step S3066: Switch the display mode of the client from the first display mode to the second display mode. The display mode of the client may be switched from the first display mode to the second display mode at a target moment (that is, a switching moment of the display mode or a next moment of the switching moment). The picture in the target game is displayed in the client in the first display mode before the target moment, and the picture in the target game is displayed in the client in the second display mode starting from the target moment.

In a case that the first state information does not match the first display mode, prompt information is displayed in the client before, during or after the adjustment while the picture in the currently running target game is displayed in the client. The prompt information is configured for prompting that the display mode of the client is switched to the second display mode.

In this technical solution, the most suitable optimization strategy technology is automatically used according to an actual operation of the game program on the mobile phone. If the performance is inadequate to provide a normal mobile phone environment for the program to run normally, prompt information may be provided at startup. In this way, the application provides high-paced game experience without any interruption, ensuring a smoother and more efficient game effect. Users do not need to learn about related performance technology, and therefore this technical solution is friendly to all age groups. It is suitable for all ages and provides excellent product experience for mobile phone products.

In an optional embodiment, the following embodiments of the present application are described in detail from a product side.

Figure 6:
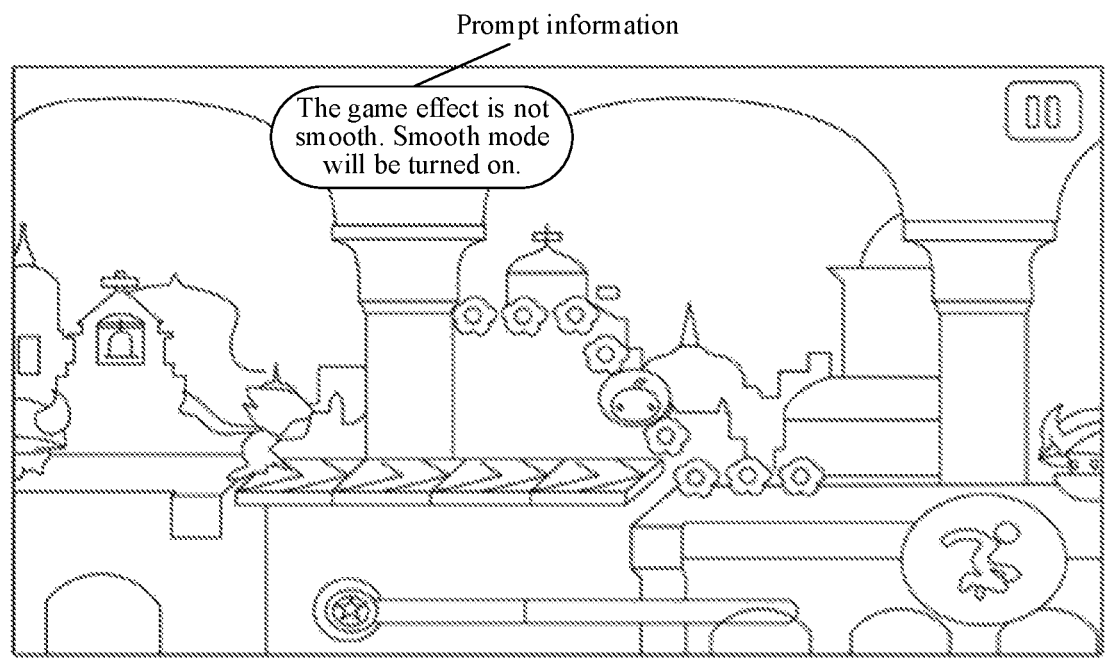
FIG. 6 is a schematic diagram of an optional optimization prompt according to an embodiment of the present application.

Optimization solutions of the game are categorized into a real-time execution category and a non-real-time execution category according to degrees of actual impact on the effect of the target game. During running of the core game, a real-time execution optimization solution can be used to ensure the game experience of players. In response to that dynamic optimization takes effect for the first time, to prevent players from getting confused by changes in a picture effect, a hover box shown in FIG. 6 is used for presenting the prompt information "The game effect is not smooth. Smooth mode will be turned on."

Figure 7:
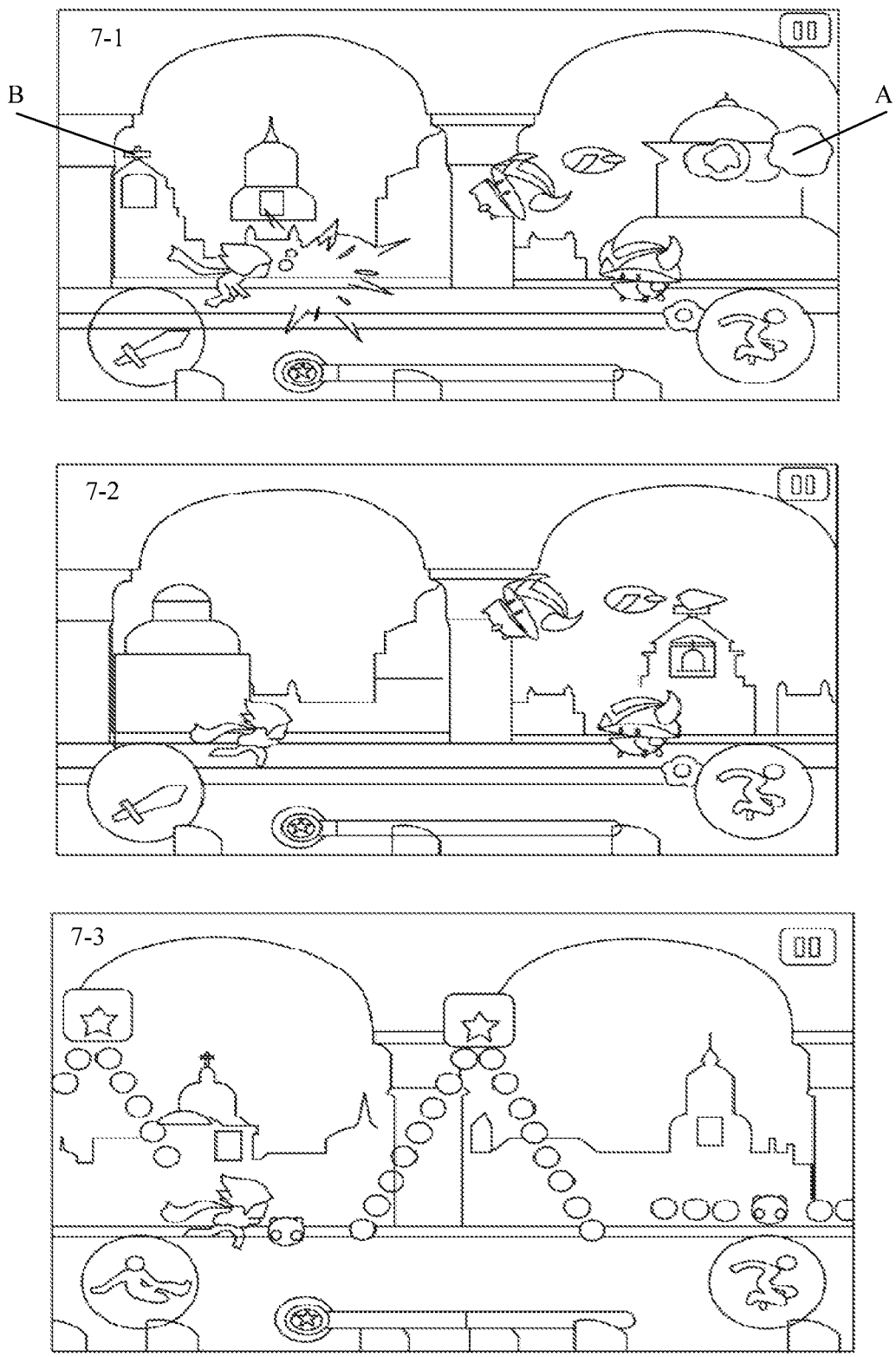
FIG. 7 is a schematic diagram of an optional game picture according to an embodiment of the present application.

Optimization solutions are graded according to optimization effects and performance impact degrees. Different levels may have different performance effects in the game. As shown in FIG. 7, the effect levels used in the sections in FIG. 7 are shown in Table 3.

TABLE 3

| Section number | Effect level | Performance |
|---|---|---|
| 7-1 | 1 | Full special effects |
| 7-2 | 2 | Effects without particles or outlines |
| 7-3 | 3 | Effects without background layers |

Compared with the full special effects in section 7-1 of FIG. 7, effects without particles and outlines (for example, the image effect marked by A is removed) are used in section 7-2 of FIG. 7.

Compared with the full special effects in section 7-1 of FIG. 7, effects without background layers (for example, the image effect marked by B is removed) are used in section 7-3 of FIG. 7.

Figure 8:
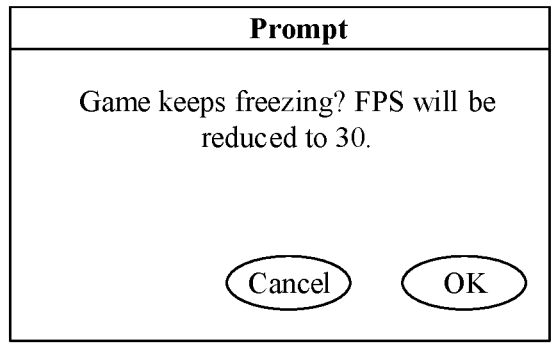
FIG. 8 is a schematic diagram of an optional optimization prompt according to an embodiment of the present application.

Some non-real-time execution performance effects that may significantly affect the experience of a player may be prompted for the player to confirm after a round of the core game is completed. For example, a frame reduction strategy "Game keeps freezing? FPS will be reduced to 30." is prompted in FIG. 8.

The game picture display method described in this embodiment of the present application is described below by using the example shown in FIG. 7.

First, the picture in the target game is displayed in the client in a display mode (that is, the first display mode) with full special effects in section 7-1 of FIG. 7 according to the current state information in response to that the mobile device runs the target game. Next, a mobile terminal acquires state information (the first state information) of the mobile device during display of the game picture in the display mode with full special effects. It is determined through comparison that the current display mode does not match the state information (for example, internal memory requirements are not met). In this case, the mobile device switches the current display mode with full special effects to a display mode with effects without particles or outlines as shown in section 7-2 of FIG. 7. Thus, the first adjustment of the display mode of the game picture is completed.

Next, the mobile device uses the display mode with effects without particles or outlines shown in section 7-2 of FIG. 7 as the first display mode, and then acquires state information (the first state information) of the mobile device during display of the game picture in this display mode. It is determined through comparison that the current display mode still does not match the state information (for example, internal memory requirements are not met). The mobile device then switches the current display modes of the effects without particles or outlines to the display mode with effects without background layers as shown in section 7-3 of FIG. 7. Thus, the second adjustment of the display mode of the game picture is completed.

Next, the mobile device uses the display mode with effects without background layers shown in section 7-3 of FIG. 7 as the first display mode, and then acquires the state information (the first state information) of the mobile device during display of the game picture in this display mode. It is determined through comparison that the current display mode still does not match the state information (for example, the internal memory requirements are still not met). The mobile device then performs the frame reduction strategy shown in FIG. 8 after a core game ends. Thus, the third adjustment of the display mode of the game picture is completed.

In addition, for some players who do not want any interference in a game, a switch for in-game dynamic optimization is configured among system switches. A user can turn on a "Smooth mode" switch.

Figure 9:
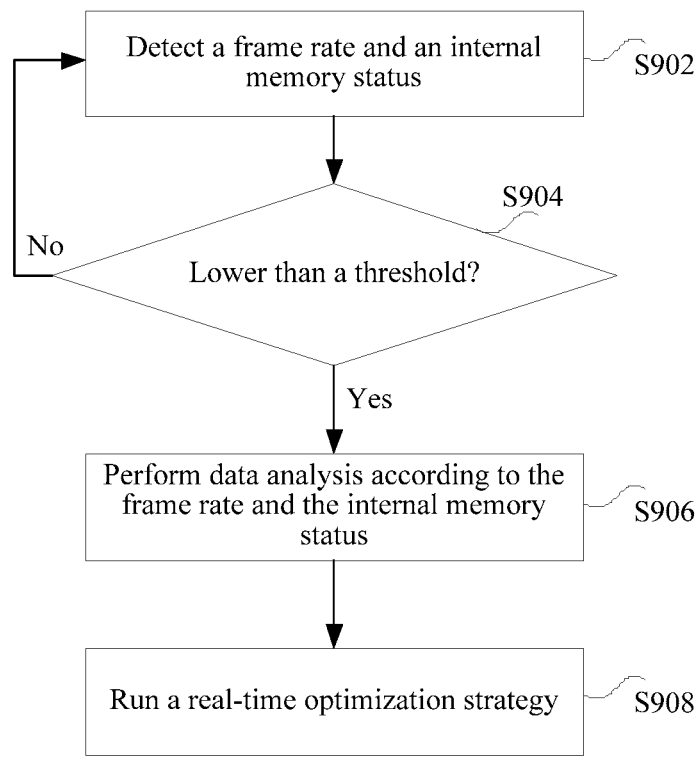
FIG. 9 is a flowchart of an optional game picture display method according to an embodiment of the present application.

The present application further provides an exemplary embodiment. The preferred embodiment is described below in detail with reference to FIG. 9 from the technical side.

Step S902: Start a runtime performance detection module, where data detected by the module mainly reflects a performance status of running of a current program. For example, a frame rate and an internal memory status of a game picture are detected.

Step S904: Compare the detected data with an actual expected running status of the game program to establish a performance threshold, determine whether the data is lower than the threshold, and if yes, perform step S906, or if not, perform step S902. The threshold may come from a configuration file or may correspond to a current set dynamic optimization level, which is called a "performance analysis data source". In response to that an actual performance value during running of a program is lower than the threshold, a performance data analysis module is to be turned on. In addition, the dynamic optimization switch in the system configuration determines whether to make threshold determination.

Optionally, the threshold may be a threshold set for each parameter, for example, a threshold set for a frame rate or a threshold set for internal memory usage. That is, a game can run smoothly in the display mode or by using a display strategy only in response to that such thresholds are met.

Optionally, the threshold may be a specific determination parameter. Determination parameters corresponding to different display modes have different values. The determination parameter is configured to generally describe remaining resources. To determine whether a value is lower than the threshold, the acquired parameters (including internal memory and CPU parameters) can be normalized to get one value, and the value is then compared with the threshold.

Step S906: The performance data analysis module performs data analysis according to the frame rate and the internal memory status. The performance data analysis module is configured to detect average machine performance within a particular period of time. The following describes a method for detecting a frame rate and a method for analyzing internal memory.

(1) Frame Rate Analysis

Acquiring a time t of m program cycles of the current game program, and acquiring average frames per second (FPS):

$$\text{avgFPS} = m/t;$$

avgFPS is compared with expected FPS targetFPS. In response to that avgFPS<targetFPS, it is determined that a sample result of one time of detection is true, or otherwise, the sample result is false.

According to the requirements of detection duration and precision, the following definition may be made: among a total of M times of detection, in response to that a quantity of times that the sample result is true≥a quantity N of times that targetFPS is reached, an overall result of one frame rate detection task is true, or otherwise, the overall result is false.

In the detection, a quantity m of detected program cycles, targetFPS, a quantity M of times of detection, and a quantity N of times that targetFPS is reached are all set values, and come from settings of the performance analysis data source.

The setting of reference values of frame rate detection and internal memory detection are described below by using a specific example:

For a setting manner of the performance analysis data source, convenient reading manners may be selected according to different programs. targetFPS is set according to requirements of a developed game. For example, an ideal frame rate of a game that has a high frame rate requirement such as a racing game or a parkour game is 60 frames per second. However, an ideal frame rate of a game such as a turn-based game or a card game that does not require that high speed is usually 30 frames per second to ensure normal running. targetFPS is set to be slightly less than the ideal frame rate according to product quality. For example, when the ideal frame rate is 60 frames per second, targetFPS may be set to 57 frames per second. Different targetFPS may be set according to different optimization levels. It is the actual effect of a project that matters.

(2) Internal Memory Analysis

It is found out whether currently available system internal memory is less than estimated required internal memory Mem of a game program, and if yes, an internal memory test result is true.

The estimated required internal memory Mem also comes from the setting of the performance analysis data source.

The performance data analysis module completes a full testing task and reports a test result to an optimization strategy module. The performance data analysis module then waits for a next self-start.

Settings of the required internal memory Mem are different according to actual cases of different game programs. The required internal memory Mem is used for ensuring a particular degree of flexibility for normal running of a game in a case that internal memory is suppressed by software outside the system on a mobile phone. When internal memory is lower than Mem, an optimization strategy may be used to release some internal memory. When a game program has stable quality, Mem of the game program may be set to be slightly greater than a maximum peak value. In addition, models with different grades may have different Mem settings according to optimization strategies used for an actual game. For example, for a low-performance model, a high optimization measure is used, and a low Mem may be correspondingly set.

Step S908: The optimization strategy module performs the real-time optimization strategy. Specifically, it can be determined according to an acquired analysis result whether optimization regulation is required and which aspect of optimization regulation is required. If optimization is required, a current set runtime dynamic optimization strategy level is raised by one level until the highest optimization level is reached. In addition, the current optimization strategy is suspended from being raised to a higher optimization strategy before the current optimization strategy is implemented, so that a non-real-time optimization strategy is raised by only one level for a single round of a game.

In the technical solution of the present application, based on a combination with the static optimization, the runtime dynamic optimization technology designed according to the characteristics of mobile phone devices can implement more flexible game optimization in more varied manners and achieve a more significant optimization effect. A game is optimized according to its actual condition during running of the game, so that suitable matching optimization manners can be automatically used for models with different performance. Optimized in-game performance is significantly improved, to provide better and smoother game experience.

In the technical solution of the present application, the "performance analysis parameter source" and the optimization strategy level for the initialization are set empirical data.

Optionally, the analysis configuration parameter most suitable for machine performance is automatically obtained through analysis by using big data and deep learning algorithms according to feedbacks of different machine performance data. For example, machine learning is guided by using the set optimization level as a dependent variable and fewer times of optimization adjustment as a target variable. In this way, a background configuration file is generated and sent to a front-end user of a game. In this way, when versions are updated iteratively, parameters that better fit a current new version can be updated to the user in time, so that user experience and game performance optimization are maximized.

For brief description, the foregoing method embodiments are represented as a series of action combinations. However, a person skilled in the art is to appreciate that the present application is not limited to the described order of the actions, because according to the present application, some steps may be performed in other orders or simultaneously. In addition, a person skilled in the art is also to know that all the embodiments described in the specification are preferred embodiments, and the related actions and modules are not necessarily mandatory to the present application.

Through the foregoing description of these implementations, it is clear to a person skilled in the art that the methods according to the foregoing embodiments may be implemented by software plus a necessary universal hardware platform, and certainly may also be implemented by hardware, but in many cases, the software implementation is exemplary. Based on such an understanding, the technical solutions of the present application essentially or the part contributing to the existing technology may be implemented in the form of a software product. The computer software product is stored in a storage medium (such as a read-only memory (ROM)/a random access memory (RAM), a magnetic disk or an optical disc) and includes several instructions for instructing a terminal device (which may be a mobile phone, a computer, a server, or a network device) to perform the methods described in the embodiments of the present application.

Figure 10:
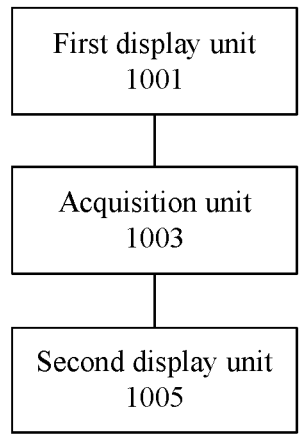
FIG. 10 is a schematic diagram of an optional game picture display apparatus according to an embodiment of the present application.

According to another embodiment of the present application, a game picture display apparatus configured to implement the foregoing game picture display method is further provided. FIG. 10 is a schematic diagram of an optional game picture display apparatus according to an embodiment of the present application. As shown in FIG. 10, the apparatus may include a first display unit 1001, an acquisition unit 1003, and a second display unit 1005.

The first display unit 1001 is configured to display a picture in a target game in a client of the target game in a first display mode in response to that the client runs the target game, the client being installed on a mobile device.

A display mode is a strategy such as a display frame rate or a picture render mode used for configuring a picture displayed in the client. Different display frame rates and picture render modes consume and require different hardware resources of the mobile device. To enable the mobile device to run a game smoothly in a corresponding display mode, the mobile device needs to maintain a particular amount of remaining resources in addition to hardware resources that need to be consumed currently.

The acquisition unit 1003 is configured to acquire first state information of the mobile device, the first state information being configured for indicating a state of the mobile device during display in the client in the first display mode.

The first state information includes one or more pieces of information such as a display frame rate, an amount of consumed hardware resources, and an amount of remaining hardware resources during the running of the game by the mobile device.

The second display unit 1005 is configured to: switch a display mode of the client from the first display mode to a second display mode in a case that the first state information does not match the first display mode, and continue to display the picture in the target game in the client in the second display mode, the second display mode being a display mode determined according to the first state information, and the target game in the client being kept in a running state in a process of switching the display mode.

To ensure that the mobile device runs the game smoothly in the first display mode, the mobile device needs to maintain remaining hardware resources and a display frame rate that are required for the first display mode. In this case, resource information and a display frame rate in the acquired first state information can be respectively compared with the required remaining resources and display frame rate corresponding to the first display mode. If the actual remaining resources are not fewer than the remaining resources required for the first display mode and the actual display frame rate is not less than the required display frame, it is determined that the first state information matches the first display mode. Otherwise, it is determined that the first state information does not match the first display mode, and the display mode needs to be switched.

Similarly, to ensure that the mobile device runs the game smoothly in the second display mode, the mobile device needs to maintain remaining hardware resources and a display frame rate required for the second display mode.

The first display unit 1001 in this embodiment may be configured to perform step S302 in Embodiment 1 of the present application, the acquisition unit 1003 in this embodiment may be configured to perform step S304 in Embodiment 1 of the present application, and the second display unit 1005 in this embodiment may be configured to perform step S306 in Embodiment 1 of the present application.

The modules are the same as examples and application scenarios implemented by corresponding steps, but are not limited to the content disclosed in the foregoing Embodiment 1. The modules can be run in the hardware environment shown in FIG. 2 as a part of the apparatus and may be implemented by software or may be implemented by hardware.

By means of the modules, a picture in a target game in a client of the target game is displayed in a first display mode in response to that the client runs the target game; first state information of a mobile device during display in the client in the first display mode is acquired; a display mode of the client is switched from the first display mode to a second display mode in a case that the first state information does not match the first display mode, and the picture in the target game continues to be displayed in the client in the second display mode, the target game in the client being kept in a running state in a process of switching the display mode. The second display mode is a display mode determined according to the first state information and matches a running state of the mobile device, so that it can be ensured that the game runs smoothly. In this way, the technical problem that a game cannot run smoothly in the related art is resolved, thereby further achieving a technical effect of adjusting a display mode to enable a game to run more smoothly without interrupting the game.

A game is set before being started in the related art. This practice is not suitable for a mobile phone environment with greatly varying performance conditions. Mobile phones have varied hardware conditions and varied systems, and many complex factors may affect performance during running. In such a fickle software running environment (for example, the start of background applications, and internal memory re-allocation), it is rather rigid or even unpractical for a user to choose performance configurations that are expected to enable the game to run smoothly.

Because mobile phones have greatly varying environmental performance conditions, game setting before a game is started is not suitable for high-paced games. For high-paced games such as battle games, parkour games, and racing games, users expect a smooth, efficient, and fast game pace. However, conventional optimization manners tend to ruin such a game pace. A player is forced to repeatedly pause a game to adjust performance during gaming, resulting in terrible user experience.

In the present application, real-time performance monitoring during running of a game application and an optimization technology with a multilevel optimization strategy set are used in combination with a conventional static optimization scheme at startup of a program, so that mobile game products can be automatically run with the best effect and efficiency under fickle hardware performance conditions, thereby improving product quality and user experience.

Optionally, the second display unit includes a switching module, configured to switch the display mode of the client from the first display mode to the second display mode at a target moment, where the picture in the target game is displayed in the client in the first display mode before the target moment, and the picture in the target game is displayed in the client in the second display mode starting from the target moment.

Optionally, the display mode of the client is configured for indicating a picture display frame rate and a picture render mode, and the second display unit includes: a first determining module, configured to: before the display mode of the client is switched from the first display mode to the second display mode, determine whether a picture display frame rate indicated by the first state information is not less than a picture display frame rate indicated by the first display mode, and determine whether a resource parameter indicated by the first state information is within a parameter range corresponding to a picture render mode indicated by the first display mode, and the resource parameter is a parameter of a hardware resource of the mobile device; and a second determining module, configured to determine that the first state information matches the first display mode in response to that it is determined that the picture display frame rate indicated by the first state information is not less than the picture display frame rate indicated by the first display mode and the resource parameter indicated by the first state information is within the parameter range corresponding to the picture render mode indicated by the first display mode.

Optionally, the hardware resource includes a computing resource and a storage resource, where the acquisition unit includes: a first acquisition module, configured to acquire a resource parameter of the computing resource of the mobile device; a second acquisition module, configured to acquire a resource parameter of the storage resource of the mobile device; and a third acquisition module, configured to acquire a picture display frame rate used by the mobile device to display the picture in the target game in the client.

Optionally, the second display unit includes: a third acquisition module, configured to acquire a plurality of display modes pre-configured in the client before the display mode of the client is switched from the first display mode to the second display mode; and a third determining module, configured to select the second display mode from the plurality of display modes according to the first state information.

Optionally, the second display unit includes: a display module, configured to: in a case that the first state information does not match the first display mode, display prompt information in the client while the picture in the currently running target game is displayed in the client, where the prompt information is configured for prompting that the display mode of the client is switched to the second display mode.

The modules or units in these embodiments are software modules corresponding to the method steps in the foregoing embodiments, and the specific implementation of these modules is similar to that in the method embodiments, which is not described herein.

In this technical solution, the most suitable optimization strategy technology is automatically used according to an actual operation of the game program on the mobile phone. If the performance is inadequate to provide a normal mobile phone environment for the program to run normally, prompt information may be provided at startup. In this way, the application provides high-paced game experience without any interruption, ensuring a smoother and more efficient game effect. Users do not need to learn about related performance technology, and therefore this technical solution is friendly to all age groups. It is suitable for all ages and provides excellent product experience for mobile phone products.

The modules are the same as examples and application scenarios implemented by corresponding steps, but are not limited to the content disclosed in the foregoing Embodiment 1. The modules can be run in the hardware environment shown in FIG. 2 as a part of the apparatus and may be implemented by software or may be implemented by hardware. The hardware environment includes a network environment.

According to another embodiment of the present application, a server or a terminal (that is, an electronic device) configured to implement the foregoing game picture display method is further provided.

Figure 11:
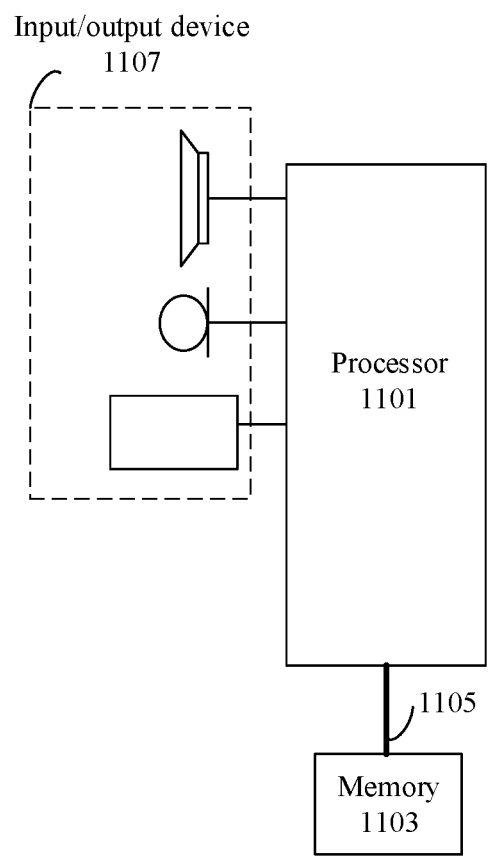
FIG. 11 is a structural block diagram of a terminal according to an embodiment of the present application.

FIG. 11 is structural block diagram of a terminal according to an embodiment of the present application. As shown in FIG. 11, the terminal may include one or more (only one is shown in the figure) processors 1101, a memory 1103, and a transmission apparatus 1105 (for example, a transmission apparatus in the foregoing embodiment). As shown in FIG. 11, the terminal may further include an input/output device 1107.

The memory 1103 may be configured to store a software program and a module, for example, a program instruction/module corresponding to a game picture display method and apparatus in an embodiment of the present application. The processor 1101 performs various functional applications and data processing by running the software program and module stored in the memory 1103 to implement the foregoing game picture display method. The memory 1103 may include a high speed RAM, and may further include a non-volatile memory, for example, one or more magnetic storage apparatuses, a flash memory, or another non-volatile solid-state memory. In some examples, the memory 1103 may further include a memory disposed remotely from the processor 1101, and the remote memory may be connected to the terminal by a network. Examples of the network include, but are not limited to, the Internet, an intranet, a local area network, a mobile communications network, and a combination thereof.

The transmission apparatus 1105 is configured to receive or transmit data by means of a network, or may further be configured to transmit data between the processor and the memory. Specific examples of the network include a wired network and a wireless network. In an example, the transmission apparatus 1105 includes a network interface controller (NIC), which may be connected to another network device and router by a cable, so as to communicate with the Internet or a local area network. In an example, the transmission apparatus 1105 is a radio frequency (RF) module, which communicates with the Internet wirelessly.

Specifically, the memory 1103 is configured to store an application.

The processor 1101 can invoke the application stored in memory 1103 through the transmission apparatus 1105 to perform the following steps: displaying a picture in a target game in a client of the target game in a first display mode in response to that the client runs the target game, the client being installed on a mobile device; acquiring first state information of the mobile device, the first state information being configured for indicating a state of the mobile device during display in the client in the first display mode; and switching a display mode of the client from the first display mode to a second display mode in a case that the first state information does not match the first display mode, and continuing to display the picture in the target game in the client in the second display mode, the second display mode being a display mode determined according to the first state information, and the target game in the client being kept in a running state in a process of switching the display mode.

The processor 1101 is further configure to perform the following steps: determining whether a picture display frame rate indicated by the first state information is not less than a picture display frame rate indicated by the first display mode, and determining whether a resource parameter indicated by the first state information is within a parameter range corresponding to a picture render mode indicated by the first display mode, where the resource parameter is a parameter of a hardware resource of the mobile device; and determining that the first state information matches the first display mode in response to that it is determined that the picture display frame rate indicated by the first state information is not less than the picture display frame rate indicated by the first display mode and the resource parameter indicated by the first state information is within the parameter range corresponding to the picture render mode indicated by the first display mode.

By means of the embodiments of the present application, a picture in a target game in a client of the target game is displayed in a first display mode in response to that the client runs the target game; first state information of a mobile device during display in the client in the first display mode is acquired; a display mode of the client is switched from the first display mode to a second display mode in a case that the first state information does not match the first display mode, and the picture in the target game continues to be displayed in the client in the second display mode, the target game in the client being kept in a running state in a process of switching the display mode. The second display mode is a display mode determined according to the first state information and matches a current running state of the mobile device, so that it can be ensured that the game runs smoothly. In this way, the technical problem that a game cannot run smoothly in the related art is resolved, thereby further achieving a technical effect of adjusting a display mode to enable a game to run more smoothly without interrupting the game.

Optionally, for a specific example in this embodiment, refer to the examples described in Embodiment 1 and Embodiment 2, and details are not described herein again in this embodiment.

A person of ordinary skill in the art may understand that the structure shown in FIG. 11 is merely an example, and the terminal may be a terminal device such as a smartphone (for example, an Android phone and an iOS phone), a tablet computer, a palmtop computer, a mobile internet device (MID), and a PAD. FIG. 11 does not constitute a limitation on a structure of the electronic device. For example, the terminal may further include more or fewer components (for example, a network interface and a display apparatus) than those shown in FIG. 11, or have configuration different with that shown in FIG. 11.

A person of ordinary skill in the art may understand that all or some of the steps of the methods in the embodiments may be implemented by a program instructing hardware relevant to a terminal device. The program may be stored in a computer-readable storage medium, and the storage medium may be a flash drive, a ROM, a RAM, a magnetic disk, an optical disc or the like.

Another embodiment of the present application further provides a storage medium. Optionally, in this embodiment, the storage medium may be configured to store program code for performing the game picture display method.

Optionally, in this embodiment, the storage medium may be located on at least one of a plurality of network devices on the network shown in the foregoing embodiment.

Optionally, in this embodiment, the storage medium is configured to store the program code used for performing the following steps:

S11: Display a picture in a target game in a client of the target game in a first display mode in response to that the client runs the target game, the client being installed on a mobile device.

S12: Acquire first state information of the mobile device, the first state information being configured for indicating a state of the mobile device during display in the client in the first display mode.

S13: Switch a display mode of the client from the first display mode to a second display mode in a case that the first state information does not match the first display mode, and continue to display the picture in the target game in the client in the second display mode, the second display mode being a display mode determined according to the first state information, and the target game in the client being kept in a running state in a process of switching the display mode.

Optionally, the storage medium is further configured to store program code used for performing the following steps:

S21: Determine whether a picture display frame rate indicated by the first state information is not less than a picture display frame rate indicated by the first display mode, and determine whether a resource parameter indicated by the first state information is within a parameter range corresponding to a picture render mode indicated by the first display mode, where the resource parameter is a parameter of a hardware resource of the mobile device.

S22: Determine that the first state information matches the first display mode in response to that it is determined that the picture display frame rate indicated by the first state information is not less than the picture display frame rate indicated by the first display mode and the resource parameter indicated by the first state information is within the parameter range corresponding to the picture render mode indicated by the first display mode.

Optionally, for a specific example in this embodiment, refer to the examples described in Embodiment 1 and Embodiment 2, and details are not described herein again in this embodiment.

Optionally, in this embodiment, the storage medium may include, but is not limited to, any medium that can store program code, such as a Universal Serial Bus (USB) flash drive, a ROM, a RAM, a removable hard disk, a magnetic disk or an optical disc.

The sequence numbers of the foregoing embodiments of the present application are merely for illustrative purposes, and are not intended to indicate priorities of the embodiments.

When the integrated unit in the foregoing embodiments is implemented in the form of a software functional unit and sold or used as an independent product, the integrated unit may be stored in the foregoing computer-readable storage medium. Based on such an understanding, the technical solutions of the present application essentially, or the part contributing to the existing technology, or all or some of the technical solutions may be implemented in the form of a software product. The computer software product is stored in a storage medium and includes several instructions for instructing one or more computer devices (which may be a PC, a server, a network device, or the like) to perform all or some of the steps of the method described in the embodiments of the present application.

In the foregoing embodiments of the present application, the description of each embodiment has respective focuses. For a part that is not described in detail in an embodiment, refer to related descriptions in other embodiments.

In the several embodiments provided in the present application, it is to be understood that the disclosed client may be implemented in another manner. For example, the described apparatus embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic, mechanical, or other forms.

The units described as separate parts may or may not be physically separate, and the parts displayed as units may or may not be physical units, may be located in one position, or may be distributed on multiple network units. A part of or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in the form of hardware, or may be implemented in the form of a software function unit.

The foregoing descriptions are merely preferred implementations of the present application, and a person of ordinary skill in the art may further make several improvements and modifications without departing from the principle of the present application. These improvements and modifications are also considered as the protection scope of the present application.

What is claimed is:

1. A game picture display method, applied to a mobile device having one or more processors and memory storing a plurality of programs to be executed by the one or more processors, the method comprising:

displaying, by the mobile device, a picture in a target game in a client in a first display mode in response to that the mobile device runs the target game, wherein the first display mode is determined based on current state information of the mobile device before running the target game;

acquiring, by the mobile device, first state information of the mobile device resulting from displaying the first picture in the target game in the client in the first display mode based on an average picture display frame rate and internal memory usage of the mobile device during a time period;

when the first state information does not match the first display mode:

performing data analysis on the target game according to the average picture display frame rate and the internal memory usage to identify a second display mode that matches the first state information; and switching, by the mobile device, a display mode of the client from the first display mode to the second display mode, and continuing to display the picture in the target game in the client in the second display mode, and the target game in the client being kept in a running state in a process of switching the display mode.

2. The method according to claim 1, wherein the switching a display mode of the client from the first display mode to a second display mode comprises:

switching the display mode of the client from the first display mode to the second display mode at a target moment, wherein the picture in the target game is displayed in the client in the first display mode before the target moment, and the picture in the target game is displayed in the client in the second display mode starting from the target moment.

3. The method according to claim 1, wherein the display mode of the client is configured for indicating a picture display frame rate and a picture render mode, and before the switching a display mode of the client from the first display mode to a second display mode, the method further comprises:

determining, in the following manner, that the first state information matches the first display mode:

determining whether a picture display frame rate indicated by the first state information is not less than a picture display frame rate indicated by the first display mode, and determining whether a resource parameter indicated by the first state information is within a parameter range corresponding to a picture render mode indicated by the first display mode, wherein the resource parameter is a parameter of a hardware resource of the mobile device; and determining that the first state information matches the first display mode in response to that it is determined that the picture display frame rate indicated by the first state information is not less than the picture display frame rate indicated by the first display mode and the resource parameter indicated by the first state information is within the parameter range corresponding to the picture render mode indicated by the first display mode.

4. The method according to claim 3, wherein the hardware resource comprises a computing resource and a storage resource, and the acquiring first state information of the mobile device comprises:

acquiring a resource parameter of the computing resource of the mobile device;

acquiring a resource parameter of the storage resource of the mobile device; and acquiring a picture display frame rate used by the mobile device to display the picture in the target game in the client.

5. The method according to claim 1, further comprising:

before the display mode of the client is switched from the first display mode to the second display mode, determining the second display mode in the following manner:

acquiring a plurality of display modes pre-configured in the client; and selecting the second display mode from the plurality of display modes according to the first state information.

6. The method according to claim 1, further comprising:

in a case that the first state information does not match the first display mode, displaying prompt information in the client while the picture in the currently running target game is displayed in the client, wherein the prompt information is configured for prompting that the display mode of the client is switched to the second display mode.

7. The method according to claim 1, further comprising:

before the client runs the target game:

acquiring current state information of the mobile device; and determining, according to the current state information of the mobile device, the first display mode configured for displaying the picture in the target game in the client during running of the target game.

8. A mobile device comprising one or more processors, memory coupled to the one or more processors and a plurality of programs stored in the memory that, when executed by the one or more processors, cause the computing device to perform a plurality of operations comprising:

displaying, by the mobile device, a picture in a target game in a client in a first display mode in response to that the mobile device runs the target game, wherein the first display mode is determined based on current state information of the mobile device before running the target game;

acquiring, by the mobile device, first state information of the mobile device resulting from displaying the first picture in the target game in the client in the first display mode based on an average picture display frame rate and internal memory usage of the mobile device during a time period;

when the first state information does not match the first display mode:

performing data analysis on the target game according to the average picture display frame rate and the internal memory usage to identify a second display mode that matches the first state information; and switching, by the mobile device, a display mode of the client from the first display mode to the second display mode, and continuing to display the picture in the target game in the client in the second display mode, and the target game in the client being kept in a running state in a process of switching the display mode.

9. The mobile device according to claim 8, wherein the switching a display mode of the client from the first display mode to a second display mode comprises:

switching the display mode of the client from the first display mode to the second display mode at a target moment, wherein the picture in the target game is displayed in the client in the first display mode before the target moment, and the picture in the target game is displayed in the client in the second display mode starting from the target moment.

10. The mobile device according to claim 8, wherein the display mode of the client is configured for indicating a picture display frame rate and a picture render mode, and before the switching a display mode of the client from the first display mode to a second display mode, the plurality of operations further comprise:
  determining, in the following manner, that the first state information matches the first display mode:
    determining whether a picture display frame rate indicated by the first state information is not less than a picture display frame rate indicated by the first display mode, and determining whether a resource parameter indicated by the first state information is within a parameter range corresponding to a picture render mode indicated by the first display mode, wherein the resource parameter is a parameter of a hardware resource of the mobile device; and
    determining that the first state information matches the first display mode in response to that it is determined that the picture display frame rate indicated by the first state information is not less than the picture display frame rate indicated by the first display mode and the resource parameter indicated by the first state information is within the parameter range corresponding to the picture render mode indicated by the first display mode.

11. The mobile device according to claim 10, wherein the hardware resource comprises a computing resource and a storage resource, and the acquiring first state information of the mobile device comprises:
  acquiring a resource parameter of the computing resource of the mobile device;
  acquiring a resource parameter of the storage resource of the mobile device; and
  acquiring a picture display frame rate used by the mobile device to display the picture in the target game in the client.

12. The mobile device according to claim 8, wherein the plurality of operations further comprise:
  before the display mode of the client is switched from the first display mode to the second display mode, determining the second display mode in the following manner:
    acquiring a plurality of display modes pre-configured in the client; and
    selecting the second display mode from the plurality of display modes according to the first state information.

13. The mobile device according to claim 8, wherein the plurality of operations further comprise:
  in a case that the first state information does not match the first display mode, displaying prompt information in the client while the picture in the currently running target game is displayed in the client, wherein the prompt information is configured for prompting that the display mode of the client is switched to the second display mode.

14. The mobile device according to claim 8, wherein the plurality of operations further comprise:
  before the client runs the target game:
    acquiring current state information of the mobile device; and
    determining, according to the current state information of the mobile device, the first display mode configured for displaying the picture in the target game in the client during running of the target game.

15. A non-transitory computer readable storage medium storing a plurality of machine readable instructions in connection with a mobile device having one or more processors, wherein the plurality of machine readable instructions, when executed by the one or more processors, cause the mobile device to perform a plurality of operations including:
  displaying, by the mobile device, a picture in a target game in a client in a first display mode in response to that the mobile device runs the target game, wherein the first display mode is determined based on current state information of the mobile device before running the target game;
  acquiring, by the mobile device, first state information of the mobile device resulting from displaying the first picture in the target game in the client in the first display mode based on an average picture display frame rate and internal memory usage of the mobile device during a time period;
  when the first state information does not match the first display mode:
  performing data analysis on the target game according to the average picture display frame rate and the internal memory usage to identify a second display mode that matches the first state information; and
  switching, by the mobile device, a display mode of the client from the first display mode to the second display mode, and continuing to display the picture in the target game in the client in the second display mode, and the target game in the client being kept in a running state in a process of switching the display mode.

16. The non-transitory computer readable storage medium according to claim 15, wherein the switching a display mode of the client from the first display mode to a second display mode comprises:
  switching the display mode of the client from the first display mode to the second display mode at a target moment, wherein the picture in the target game is displayed in the client in the first display mode before the target moment, and the picture in the target game is displayed in the client in the second display mode starting from the target moment.

17. The non-transitory computer readable storage medium according to claim 15, wherein the display mode of the client is configured for indicating a picture display frame rate and a picture render mode, and before the switching a display mode of the client from the first display mode to a second display mode, the plurality of operations further comprise:
  determining, in the following manner, that the first state information matches the first display mode:
    determining whether a picture display frame rate indicated by the first state information is not less than a picture display frame rate indicated by the first display mode, and determining whether a resource parameter indicated by the first state information is within a parameter range corresponding to a picture render mode indicated by the first display mode, wherein the resource parameter is a parameter of a hardware resource of the mobile device; and
    determining that the first state information matches the first display mode in response to that it is determined that the picture display frame rate indicated by the first state information is not less than the picture display frame rate indicated by the first display mode and the resource parameter indicated by the first state information is within the parameter range corresponding to the picture render mode indicated by the first display mode.

18. The non-transitory computer readable storage medium according to claim 15, wherein the plurality of operations further comprise:

before the display mode of the client is switched from the first display mode to the second display mode, determining the second display mode in the following manner:
acquiring a plurality of display modes pre-configured in the client; and
selecting the second display mode from the plurality of display modes according to the first state information.

19. The non-transitory computer readable storage medium according to claim 15, wherein the plurality of operations further comprise:
in a case that the first state information does not match the first display mode, displaying prompt information in the client while the picture in the currently running target game is displayed in the client, wherein the prompt information is configured for prompting that the display mode of the client is switched to the second display mode.

20. The non-transitory computer readable storage medium according to claim 15, wherein the plurality of operations further comprise:
before the client runs the target game:
acquiring current state information of the mobile device; and
determining, according to the current state information of the mobile device, the first display mode configured for displaying the picture in the target game in the client during running of the target game.

* * * * *